Sept. 7, 1937.  H. A. WRIGHT  2,092,038
SORTING AND CLASSIFYING DEVICE
Filed Aug. 14, 1934
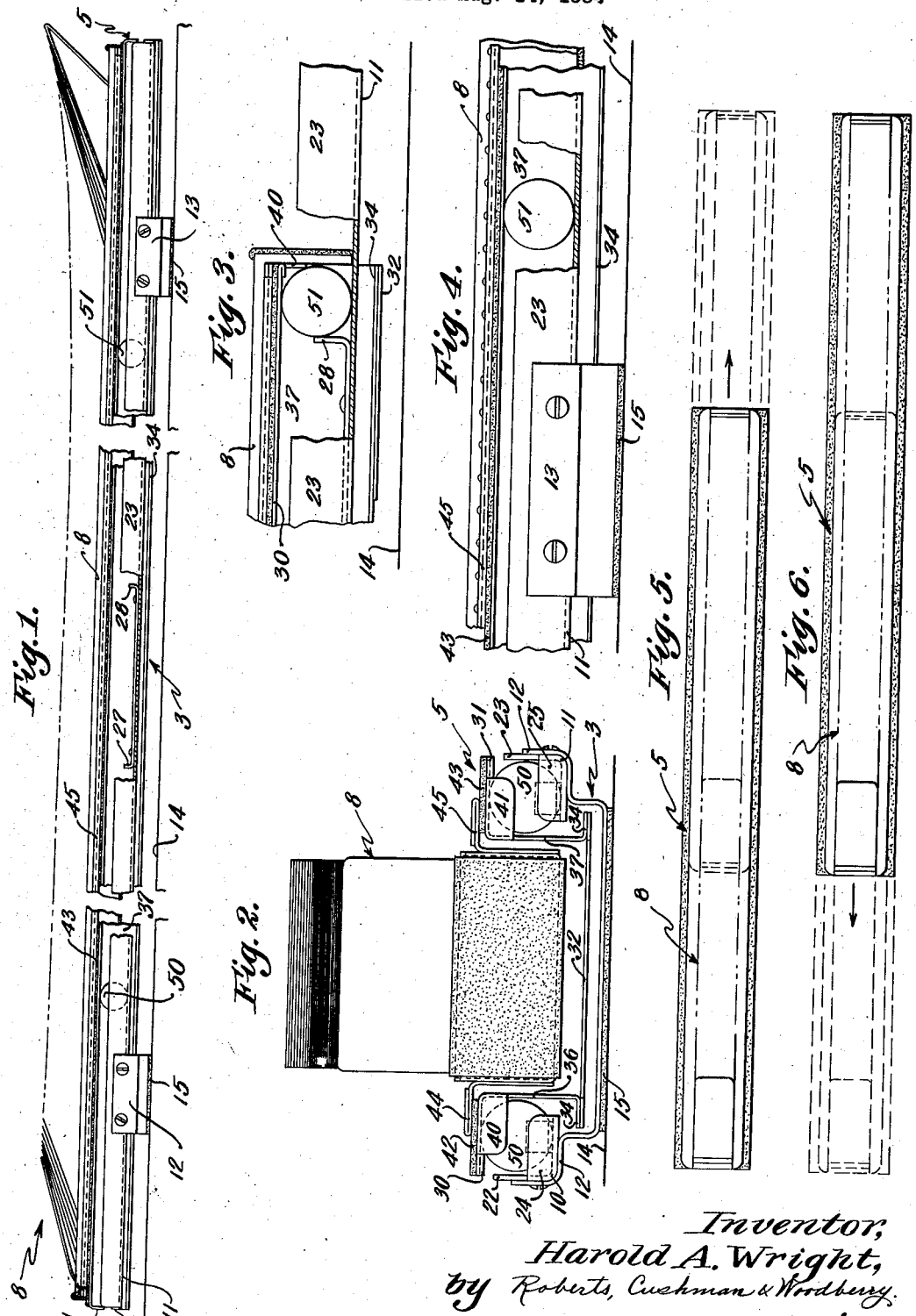
Inventor,
Harold A. Wright,
by Roberts, Cushman & Woodbury.
Atty's.

Patented Sept. 7, 1937

2,092,038

UNITED STATES PATENT OFFICE 2,092,038

SORTING AND CLASSIFYING DEVICE

Harold A. Wright, Newton, Mass., assignor to Arthur W. Brooks, doing business under the name and style of Multisort Company, Boston, Mass.

Application August 14, 1934, Serial No. 739,764

10 Claims. (Cl. 104—135)

This invention relates to an improvement in sorting and classifying devices for use in classifying sales slips, letters, circulars, and the like, in alphabetical, numerical or other arrangements.

The principal objects of the invention are to provide a reciprocal carriage and a base or track therefor, which is of simple design, of light weight and of strong and rigid construction, embodying a minimum number of parts, and which is economical to manufacture and easy to assemble; to provide a carriage and base of the aforesaid type which is noiseless and vibrationless in operation and which may be moved from one position to another with great ease and without the necessity of employing parts requiring lubrication; and to provide a carriage and base which may be moved bodily from one place to another without dismembering the parts and which may be subjected to hard usage without danger of deranging or injuring the parts.

Further objects relate to the construction of my improved device and will be apparent from a consideration of the following description and the accompanying drawing, wherein Fig. 1 is a side elevation, with parts broken away and shown in section, of a sorting and classifying device constructed in accordance with the present invention;

Fig. 2 is an enlarged end elevation of the device shown in Fig. 1;

Figs. 3 and 4 are enlarged fragmentary side elevations, with parts broken away and shown in section, of the device shown in Fig. 1, the carriage being shown in different positions relative to the base or track; and Figs. 5 and 6 are top plan views showing the carriage at different positions on the base or track.

The embodiment chosen for the purpose of illustration comprises a base member 3 which supports a carriage or carrier 5 for reciprocatory movement, and a classifying container or tray 8 disposed on the carriage 5 and movable therewith. The classifying container may be of the usual type for sorting and classifying sales slips, letters, cards, circulars and the like, such, for example, as is shown in Letters Patent No. 1,931,785, granted to me on October 24, 1933, to which reference may be had for a more complete description.

The base member is preferably of sheet metal construction having parts shaped and arranged to provide elongate tracks and to this end may comprise a pair of angle irons 10 and 11 which are rigidly secured in spaced parallelism by crossbars or members 12 and 13 adjacent to each end. The crossbars 12 and 13 are preferably bent or shaped to provide depending leg portions or supports which hold the angle irons 10 and 11 in spaced relation to the top of a bench, desk or table 14 upon which the device may be supported. The under surface of the crossbars 12 and 13 may be provided with suitable cushioning material such as a layer of soft rubber 15 so that the base will not scar the surface of the table. The angle irons 10 and 11 provide a pair of spaced lower tracks, each having upwardly projecting lateral retaining rails or flanges 22 and 23, as shown in Figs. 2 to 4. The ends of each track are provided with upwardly bent lugs 24 and 25 (Fig. 2) which provide stops and each of the tracks is also provided with spaced center stops 27 and 28 (Fig. 1) disposed on each side of their transverse center.

The carriage is preferably of sheet metal construction having parts constructed and arranged to provide upper tracks and to this end may comprise a pair of channel irons 30 and 31 which provide upper rails or tracks in superposed spaced relation to the lower tracks 10 and 11, their intermediate web portions providing depending lateral rails or flanges 36 and 37 which are disposed in spaced relation to the retaining flanges 22 and 23 of the lower tracks 10 and 11, as shown in Figs. 2 to 4, and define therewith a pair of elongate channels between the interfitting parts of the carriage and base. The lower flanges 34 and 35 of the carriage preferably underlie the lower tracks 10 and 11, respectively, of the base, as shown in Fig. 2, and thus prevent the carriage from being lifted bodily from the base. Each end of the upper track 30 and 31 is provided with downwardly bent lugs 40 and 41 (Fig. 2) which provide stops which cooperate with the center stops 27 and 28 to limit the movement of the carriage. The distance between the end stops on the front of the carriage and base, and the center stops 27 is equal to that between the corresponding stops on the rear of the carriage and base, and the center stops 28, thus equalizing the forward and rearward movement of the carriage. If desired, the upper surface of tracks 30 and 31 may be provided with cushioning material such as layers of soft rubber 42 and 43 on which the supporting flanges 44 and 45 of the classifying container 8 may be mounted.

Ball bearing members 50, 51 are disposed in each of the channels between the upper and lower tracks, each of the balls preferably being of hardened steel having a diameter conforming substantially to the distance between the lateral retaining flanges 22, 36 and 23, 37. As herein shown, a pair of ball bearing members is disposed in each channel, one between the center stops and each of the end stops, as shown in Fig. 1, although a greater number may be used if desired. The balls 50, 51 thus support the carriage for reciprocatory movement along the tracks 10 and 11 and by reason of their engagement with the retaining flanges 22, 36 and 23, 37, they maintain the interfitting parts of the carriage and base members in spaced relationship, thus preventing binding and lateral play, and insuring a smooth, noiseless and vibrationless operation of the carriage. As the balls 50, 51 are movable fixed distances along the tracks 10 and 11, the front balls 50 are normally maintained equal distances from the rear balls 51, and hence at all times provide a four-point support for the carriage regardless of its position relative to the base.

The movement of the carriage to either an extreme forward or rearward position, as indicated by the broken lines of Figs. 5 and 6 automatically maintains the normal position of the balls relative to each other, as it will be noted that when the carriage is moved to its extreme forward position (indicated by the broken lines of Fig. 6) the balls 51 are held between the rear stops 40, 41 and the center stops 28 (Fig. 3), and the forward movement of the balls 50 is limited by the front stops 24 and 25; and when the carriage is moved to its extreme rearward position (as indicated by the broken lines of Fig. 5) the relative positions of the balls and stops are reversed. Hence, even though the balls become displaced within the channels, movement of the carriage back and forth causes them to return to their normal positions, thus maintaining an even balance of the carriage in all positions.

Furthermore, due to the fact that the engagement between the balls and the tracks and retaining flanges is merely a point contact, there is little, if any, frictional resistance and hence there is no necessity of lubricating the moving parts in order to insure a smooth and noiseless operation of the carriage.

While I have shown and described one desirable embodiment of the present invention it should be understood that the present disclosure is for the purpose of illustration only and that various changes in shape, proportion and arrangement of parts, as well as the substitution of equivalent elements for those herein shown and described, may be made without departing from the spirit and scope of the invention as set forth in the appended claims.

I claim:

1. Apparatus for use in sorting and classifying sales slips, letters, circulars, etc., which comprises a base member having means defining a pair of spaced tracks, a plurality of balls disposed on said tracks and freely movable from one position to another, and a carriage supported on said balls for movement along said tracks.

2. Apparatus for use in sorting and classifying sales slips, letters, circulars, etc., which comprises a base member having means defining a pair of spaced tracks, a plurality of balls disposed on said tracks and freely movable from one position to another, a carriage supported on said balls for reciprocatory movement along said tracks, and means for limiting the movement of said carriage.

3. Apparatus for use in sorting and classifying sales slips, letters, circulars, etc., which comprises a base member having means defining a pair of spaced tracks, at least one ball disposed adjacent to one end of said tracks, each ball being movable along said track from one end to a point intermediate the ends of said tracks, and a carriage supported on said balls for reciprocatory movement along said tracks.

4. Apparatus for use in sorting and classifying sales slips, letters, circulars, etc., which comprises a base member having means defining a pair of spaced tracks, a plurality of balls disposed on said tracks and freely movable from one position to another, and a carriage supported on said balls for reciprocatory movement along said tracks, said carriage having parts disposed in interfitting relation to said base member and operative to retain said carriage in operating position.

5. Apparatus for use in sorting and classifying sales slips, letters, circulars, etc., which comprises a pair of elongate members having spaced interfitting parts defining an elongate channel, a plurality of balls disposed in said channel, said balls normally being spaced from each other and freely movable from one position to another, said balls maintaining said parts in spaced relation and supporting one of said members for reciprocatory movement relative to the other.

6. Apparatus for use in sorting and classifying sales slips, letters, circulars, etc., which comprises a pair of elongate members having spaced interfitting parts defining an elongate channel, one of said members constituting a base and the other member constituting a carriage adapted to receive a classifying container, a plurality of balls disposed in said channel, said balls normally being spaced from each other and freely movable from one position to another, said balls maintaining said parts in spaced relation and supporting the carriage member for reciprocatory movement relative to the base member.

7. Apparatus for use in sorting and classifying sales slips, letters, circulars, etc., which comprises a pair of elongate members having complementary parts which define an elongate channel, a plurality of balls disposed in said channel, said balls normally being spaced from each other and freely movable from one position to another, said balls maintaining said complementary parts in spaced relation and supporting one of said members for reciprocatory movement relative to the other.

8. Apparatus for use in sorting and classifying sales slips, letters, circulars, etc., which comprises a base having an elongate surface providing a lower track, a carriage in superposed relation to said base and having an elongate surface corresponding to the surface of said base and providing an upper track, said surfaces defining an elongate channel, and a plurality of balls disposed in said channel in spaced relation to each other, said balls being freely movable along said tracks and operative to support said carriage for reciprocatory movement relative to said base.

9. Apparatus for use in sorting and classifying sales slips, letters, circulars, etc., which comprises a sheet metal base having parts shaped and arranged to provide an elongate lower track and a lateral retaining flange, a carriage of sheet metal arranged in superposed relation to said base, said carriage having parts shaped and arranged to provide an upper track and a lateral retaining flange, a plurality of balls interposed between said upper and lower tracks and said lateral retaining flanges, said balls supporting said carriage for reciprocatory movement relative to said base.

10. Apparatus for use in sorting and classifying sales slips, letters, circulars, etc., which comprises a base member including a pair of spaced angle irons providing a pair of lower tracks each having an upwardly projecting retaining flange, a carriage in superposed relation to said base, said carriage having a pair of spaced angle irons providing a pair of upper tracks each having a depending lateral flange spaced from the corresponding flange of the lower tracks and a plurality of balls interposed between said upper and lower tracks and the lateral flanges, said balls supporting said carriage for reciprocatory movement relative to said base.

HAROLD A. WRIGHT.